United States Patent Office 3,801,612
Patented Apr. 2, 1974

3,801,612
ALIPHATIC SUBSTITUTED-2-EN-4-YNE
ACIDS AND ESTERS
William E. Willy and Clive A. Henrick, Palo Alto, Calif., assignors to Zoecon Corporation, Palo Alto, Calif.
No Drawing. Filed Sept. 11, 1972, Ser. No. 288,169
Int. Cl. A01n 9/24; C07c 57/18, 59/18
U.S. Cl. 260—410.9 R
10 Claims

ABSTRACT OF THE DISCLOSURE

Aliphatic substituted acids and esters with olefinic unsaturation at C–2 and acetylenic unsaturation at C–4, synthesis thereof, intermediates therefor, derivatives thereof, and the control of insects.

This invention relates to novel en-yne compounds which are useful for the control of insects. More particularly, the novel compounds of the present invention are represented by the following Formula A:

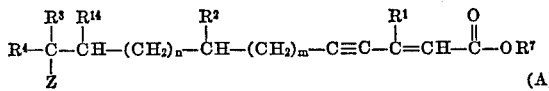

(A)

wherein, each of $R^1$, $R^2$, $R^3$ and $R^4$ is lower alkyl; $R^{14}$ is hydrogen or lower alkyl;
each of $m$ and $n$ is the positive integer one, two or three;
Z is hydrogen or the group —OR in which R is hydrogen or lower alky; and
$R^7$ is hydrogen, lower alkyl, lower alkenyl, lower alkynyl or cycloalkyl.

The compounds of Formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of Formula A. Generally, a concentration of less than 25% of the active compound is employed. The formulations can include insect attractants, emulsifying agents or wetting agents to assist in the application and effectiveness of the active ingredient.

In the description hereinafter, each of R–$R^4$, $R^7$, $R^{14}$, $m$, $n$ and Z is as defined above, unless otherwise specified.

The novel en-yne esters of the present invention (A', $R^{7'}\neq$hydrogen) can be prepared by the reaction of a primary halide, preferably the bromide, of Formula I with the lithium salt of an acetylenic ketone which has the carbonyl function protected with, for example, a dioxolane or a dialkyl acetal group (II), in a mixture of fairly polar solvents such as tetrahydrofuran-ether-dimethylsulfoxide and in the presence of an ethylenediamine catalyst such as tetramethylethylenediamine or tetraethylethylenediamine, to obtain an acetylenic compound of Formula III which, after removal of the protecting group by acid hydrolysis, is condensed with the carbanion of a phosphonate of Formula IV to yield the novel compounds of Formula A'. The overall synthesis can be outlined as follows:

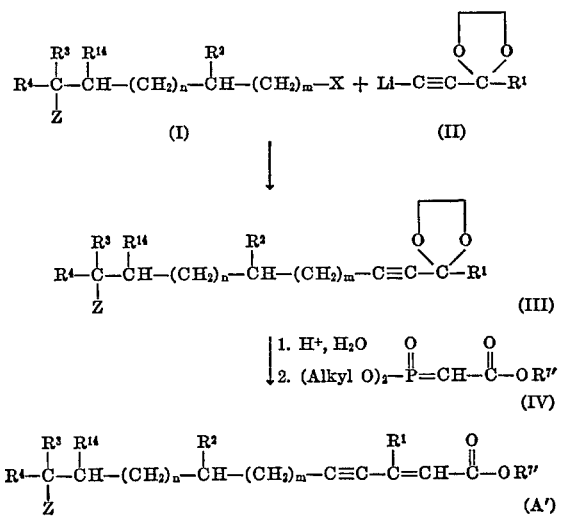

In the above formulas, X is chloro, bromo or iodo and $R^{7'}\neq$hydrogen.

The phosphonates of Formula IV are converted into the corresponding anions by treatment with a base, such as an alkali metal hydride, or an alkali metal alkoxide, e.g., sodium hydride or sodium methoxide, in an organic solvent inert to the reaction such as a hydrocarbon, ether, dialkylformamide or dialkylsulfoxide solvent, e.g., benzene, toluene, tetrahydrofuran, dimethylformamide, and the like. The reaction is conducted at a temperature of from about —20° C. to room temperature or above. The reaction of the phosphonate anion with the ketone is generally conducted at a temperature of about 0° C. to room temperature or above. The preparation of the phosphonate anions and their condensation with a carbonyl group can be made as described by Pattenden and Weedon, J. Chem. Soc. (C), 1984 and 1997 (1968); Sasaki, Bull, Chem. Soc. Japan 41, 1252 (1968), and U.S. Pats. 3,163,-699 and 3,177,226.

The esters (A') are converted into the corresponding acids (A; $R^7$ is hydrogen) by hydrolysis with base, such as KOH, NaOH, potassium or sodium carbonate in an aqueous polar organic solvent such as methanol or ethanol. Other esters of the present invention can be prepared by transesterification or conversion of the acid into the acid halide by treatment with thionyl chloride, oxalyl chloride or the like, in an organic solvent inert to the reaction such as benzene, ether, or the like, and then reacting the acid halide with the alcohol corresponding to the ester moiety desired.

The starting material halides of Formula I wherein Z is hydrogen are either commercially available or can be prepared from the corresponding C–1 terminal olefin via the hydroboration-halogenation procedure of Brown and Lane, J. Amer. Chem. Soc. 92, 6660 (1970). Thus, a primary bromide for example, is prepared by treating the terminal olefin with borane ($BH_3$) in tetrahydrofuran followed by addition of bromine in the presence of methanolic sodium methoxide.

Some of the starting material halides of Formula I wherein Z is —OR (R is hydrogen or lower alkyl) can be prepared as described above from the corresponding hydroxy or alkoxy substituted terminal olefin. They can also be prepared by transforming a commercially available unsaturated aldehyde precursor, such as (V), in the manner outlined below:

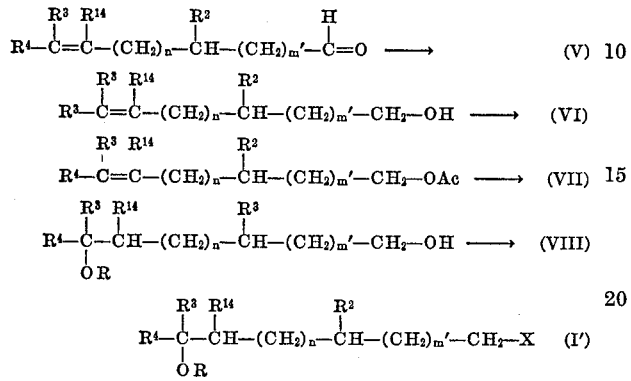

In the above formulas, $m'$ is zero, one or two; Ac is acetyl; R is hydrogen or lower alkyl, and X is the preferred halide, bromo. The aldehyde group in (V) is reduced with sodium borohydride or the like in an alcohol solvent such as ethanol, to the hydroxy group (VI) which is then acetylated in the conventional way with acetic anhydride in pyridine to give the acetate (VII). The introduction of Z being —OR in which R is hydrogen, and the hydrolysis of the acetate moiety, is then performed by adding water to the terminal double bond of (VII) using a mercuric salt such as mercuric acetate in an aqueous ether solvent, followed by reduction of the oxymercurial intermediate in situ using sodium boro-hydride, or the like, in the presence of a strong inorganic base such as potassium hydroxide. By conducting the reaction in the presence of an alcohol (R—OH) such as methanol, ethanol, isopropanol, and the like, the corresponding ether (Z is —OR in which R is lower alkyl) is prepared. See Brown and Rei, J. Amer. Chem. Soc. 91, 5646 (1969); Wakabayashi; J. Med. Chem. 12, 191 (1969); Brown et al., J. Amer. Chem. Soc. 89, 1522 and 1524 (1967), and Birks and Wright, J. Amer. Chem. Soc. 62, 2412 (1940). The substituted alcohol thus obtained (VIII) is converted into the desired bromide (I') in two steps, by first preparing the corresponding tosylate using tosyl chloride in pyridine and then displacing the tosylate group with bromide ion, e.g. from lithium bromide, in acetone. See Wiberg and Lowry, J. Amer. Chem. Soc. 85, 3188 (1963).

The lithium ketal-acetylides of Formula II are prepared from the corresponding commercially available terminal acetylenic ketone, by treatment with ethylene glycol in the presence of an acid catalyst, such as the preferred p-toluenesulfonic acid, to protect the carbonyl function against the basic conditions that follow, and then forming the lithium salt using butyl lithium in a solvent mixture such as tetrahydrofuran:ether 1:1 at about $-60°$ C.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "lower alkenyl," as used herein, refers to an ethylenically unsaturated hydrocarbon group, branched or straight chain, having a chain length of two to six carbon atoms, e.g., allyl, vinyl, 3-butenyl, 2-hexenyl and i-propenyl.

The term "lower alkynyl," as used herein, refers to an acetylenically unsaturated hydrocarbon group, branched or straight chain, having a chain length of three to six carbon atoms, e.g. 2-propynyl, 3-pentynyl, etc.

The term "cycloalkyl," as used herein, refers to a cyclic alkyl group containing three to eight carbon atoms, e.g. cyclopropyl, cyclopentyl and cyclohexyl.

The following examples are provided to illustrate the practice of the present invention. Temperature is given in degrees centigrade.

EXAMPLE 1

To 5 g. of but-3-yn-2-one and 4.64 g. of ethylene glycol in 35 ml. of methylene dichloride is added 0.58 g. of p-toluenesulfonic acid and the resulting mixture heated to reflux in an inverted Dean-Stark apparatus adapted to the reaction flask to collect the water that is being formed. After about 7 hours of reflux, when approximately the calculated amount of water has been collected, the mixture is allowed to cool to room temperature and then solid sodium bicarbonate is added and the mixture stirred overnight. The solid is filtered off and the filtrate is evaporated in vacuo to yield the desired product, but-3-yn-2-one ethylene ketal.

EXAMPLE 2

A solution of 2.5 g. of 2,6-dimethylhept-1-ene in 10 ml. of dry tetrahydrofuran is stirred under nitrogen at 0°. A 1 M solution (6.93 ml.) of $BH_3$ in tetrahydrofuran is added dropwise in about 15 minutes. After addition is complete, the mixture is stirred at 0° for about 45 minutes and then at 20° for about 1 hour. Two drops of dry methanol are added to destroy any excess reagent present. Bromine (1.08 ml.) and 6.16 ml. of a 3.63 M solution of sodium methoxide in methanol are then slowly added simultaneously to the mixture while stirring at room temperature. The reaction is stirred at room temperature for about 1 hour and then worked up with hexane, water and saturated aqueous potassium carbonate solution. The organic layer is separated, washed with water and brine, dried over calcium sulfate and evaporated with vacuo to give crude 1-bromo-2,6-dimethylheptane which is purified by distillation at reduced pressure.

EXAMPLE 3

The ketal-acetylene of Example 1 (10.65 g.) in 50 ml. of a dry 1:1 mixture of tetrahydrofuran-ether is added dropwise to a 1.55 M solution of butyl lithium in hexane (58.5 ml.) in 50 ml. of tetrahydrofuran:ether 1:1, while stirring at $-65°$ under nitrogen. After addition is complete (about 1 hour), the reaction mixture is stirred at $-60°$ for one hour and then at $-30°$ for 0.5 hour. At this temperature, the bromide of Example 2 (19.7 g.) in 30 ml. of tetrahydrofuran:ether 1:1, is added to the reaction mixture in about 1 hour. The temperature is allowed to rise slowly and at 0°, dry dimethylsulfoxide (150 ml.) and tetramethylethylenediamine (1.105 g.) is added and the resulting mixture stirred at room temperature for 16-18 hours. The reaction is then poured into ice-ammonium chloride solution and extracted with hexane. The combined extracts are washed with water and brine, dried over calcium sulfate and evaporated with vacuo. The crude product is purified by distillation at reduced pressure to give 6,10-dimethylundec-3-yn-2-one ethylene ketal (III).

EXAMPLE 4

To 14.0 g. of the ketal of Example 3 in 1.5 ml. of water and 45 ml. of p-dioxane is added about 0.5 ml. of 2 N sulfuric acid and the mixture warmed to 40° for 2 or 3 hours. After cooling to room temperature or below, the solution is neutralized with saturated aqueous sodium bicarbonate. Water is added and the mixture is extracted with hexane. The hexane layers are combined, washed with brine and dried over calcium sulfate. Removal of solvent in vacuo followed by distillation of the residual product at reduced pressure affords the ketone, 6,10-dimethylundec-3-yn-2-one.

EXAMPLE 5

To sodium hydride (1.78 g. of 57% dispersion in oil) washed three times with pentane, in 100 ml. of dry dimethylformamide, is slowly added over a period of 20 minutes triethyl phosphonoacetate (9.75 g.) at room temperature, with stirring under nitrogen. The mixture is stirred for an additional hour. The acetylenic ketone of Example 4 (8.0 g.) is then added dropwise to the mixture and stirring is continued for about 45 minutes. The reaction is worked up by pouring into saturated ammonium chloride solution and ice, followed by extraction with ether and hexane. The combined organic layers are washed with aqueous sodium chloride solution, dried over calcium sulfate and evaporated in vacuo. The crude product, ethyl 3,7,11-trimethyldodec-2-en-4-ynoate, is a mixture of the C–2 trans and C–2 cis isomers. The isomers are separated by preparative thin layer chromatography eluting with 10% ether in hexane, and further purified by distillation under reduced pressure.

EXAMPLE 6

To a mixture of 13.5 g. of sodium borohydride and 1000 ml. of absolute ethanol, stirring under nitrogen at 0°, is slowly added 100 g. of 2,6-dimethylhept-5-en-1-al (melonal) over a period of one hour. The homogeneous mixture is left at room temperature for about 6.5 hours. Solvent is evaporated to half the volume with vacuo, and then water and enough solid sodium chloride to saturate the system is added. The mixture is extracted with ether; the ether extracts are combined, washed with brine and dried over calcium chloride to yield 2,6-dimethylhept-5-en-1-ol.

EXAMPLE 7

To a mixture of 87.2 g. of 2,6-dimethylhept-5-en-1-ol and 396 ml. of pyridine is added, at 0° under nitrogen, 125 g. of acetic anhydride over a period of 30 minutes. The mixture is stirred initially till homogeneous and then is left at room temperature for about 18 hours. The reaction is quenched with ice-water and extracted with ether. The organic layer is washed with dilute hydrochloric acid, saturated aqueous sodium bicarbonate, water, saturated aqueous copper sulfate (to remove last traces of pyridine), water and brine. Drying over calcium chloride and evaporation of the solvent with vacuo affords 2,6-dimethyl-hept-5-en-1-ol acetate.

EXAMPLE 8

A slurry of mercuric acetate (113 g.) in 300 ml. of dry methanol is slowly added to a mixture of 50 g. of the acetate of Example 7 and 100 ml. of dry methanol, stirring under nitrogen at 0°. The resulting mixture is stirred at 0° for 2 hours and overnight at room temperature. Potassium hydroxide (59.6 g.) in 150 ml. of methanol is then added, at 0°, over a period of 15 minutes, followed by the addition of 6.68 g. of sodium borohydride in small portions. Stirring is continued for about four hours. Water (100 ml.) is then added at 0°, the ice-bath is removed and the mixture stirred overnight. After reducing the volume to half by evaporation under vacuum, the reaction mixture is decanted into water and extracted with ether. The combined organic layers are washed with water until neutral, dried and evaporated at reduced pressure to give 6-methoxy-2,6-dimethylheptan-1-ol, which can be purified by distillation.

EXAMPLE 9

To a mixture of 32 g. of tosyl chloride and 63 ml. of dry pyridine, at 0°, under nitrogen, is added a solution of 24.4 g. of the methoxy-alcohol of Example 8 in 50 ml. of dry pyridine, dropwise. The reaction mixture is maintained at −10° for about 16 hours. Cold water (3 ml.) is then slowly added to the mixture. After 2 hours at 0°, the reaction is poured into cold water and extracted with cold ether. The ether extracts are washed with cold dilute sulfuric acid, cold 10% aqueous potassium bicarbonate, cold water, cold saturated aqueous copper sulfate, cold water and cold brine; dried over calcium sulfate and evaporated with vacuo to yield the corresponding methoxy-tosylate.

EXAMPLE 10

(A) Anhydrous lithium bromide (48.6 g.) is added, in about 10 minutes, to 43 g. of the methoxy-tosylate of Example 9 in 250 ml. of dry acetone, at 0°, under nitrogen. The resulting mixture is stirred at room temperature overnight and then refluxed for about 8 hours. Once at room temperature, the mixture is filtered and the filter cake washed twice with 50 ml. portions of acetone. The combined acetone solutions are evaporated in vacuo. The residue is shaken with pentane and filtered, washing well the solid with more pentane. The combined filtrate and pentane washings are washed with water and brine, dried over calcium sulfate, and evaporated to reduce pressure to give 1-bromo-6-methoxy-2,6-dimethylheptane.

(B) The thus-prepared bromide is used in place of 1-bromo-2,6-dimethylheptane in the procedure of Example 3 and then processed as described in Examples 4 and 5 to prepare ethyl 11-methoxy-3,7,11-trimethyldodec-2-en-4-ynoate.

EXAMPLE 11

Each of the bromides under column (I) is reacted with but-3-yn-2-one ethylene ketal and butyllithium as described in Example 3 and the resulting product hydrolyzed as in Example 4, and then condensed with the carbanion of triethyl phosphonacetate, as in Example 5, to prepare the en-yne esters under column (II).

(I)

1-bromo-6,7-dimethyl-3-ethyloctane;
1-bromo-4,7-dimethylnonane;
1-bromo-7-hydroxy-3,7-dimethyloctane;
1-bromo-7-ethoxy-2-ethyl-7-methyloctane;
1-bromo-2,5-dimethylhexane; and
1-bromo-6-hydroxy-6-methyl-2-ethylheptane.

(II)

ethyl 8-ethyl-3,11,12-trimethyltridec-2-en-4-ynoate;
ethyl 3,9,12-trimethyltetradec-2-en-4-ynoate;
ethyl 12-hydroxy-3,8,12-trimethyltridec-2-en-4-ynoate;
ethyl 12-ethoxy-3,12-dimethyl-7-ethyltridec-2-en-4-ynoate;
ethyl 3,7,10-trimethylundec-2-en-4-ynoate; and
ethyl 11-hydroxy-3,11-dimethyl-7-ethyldodec-2-en-4-ynoate.

EXAMPLE 12

A mixture of 1 g. of ethyl 3,7,11-trimethyldodec-2-en-4-ynoate, 60 ml. of methanol, 0.25 g. of sodium carbonate and 6 ml. of water is stirred at about 30° for about 48 hours. The mixture is then diluted with water, neutralized and extracted with ether. The organic phase is washed with water, dried over sodium sulfate and evaporated to yield 3,7,11-trimethyldodec-2-en-4-ynoic acid.

EXAMPLE 13

To 3 g. of ethyl 11-methoxy-3,7,11-trimethyldodec-2-en-4-ynoate in 150 ml. of methanol is added 1.5 g. of potassium hydroxide in 15 ml. of water. The mixture is heated to reflux for about 8 hours. The mixture is then diluted with water, neutralized and extracted with ether. The organic extracts are washed with water, dried over calcium chloride and evaporated to give 11-methoxy-3,7,11-trimethyldodec-2-en-4-ynoic acid.

EXAMPLE 14

To 1.5 g. of 3,7,11-trimethyldodec-2-en-4-ynoic acid in 25 ml. of dry benzene, stirring under nitrogen, is added 2 ml. of oxalyl chloride. The mixture is stirred for 2 hours at room temperature. Solvent is then removed at reduced pressure to obtain 3,7,11-trimethyldodec-2-en-4-ynoyl chloride.

To the thus-prepared acid chloride is added 15 ml. of fresh dry benzene and 2.2 g. of isopentyl alcohol under nitrogen. The mixture is stirred at room temperature under nitrogen for 24 hours. The mixture is then diluted with water and extracted with ether. The organic layer is washed with water and brine, dried over calcium sulfate and evaporated with vacuo to yield isopentyl 3,7,11-trimethyldodec-2-en-4-ynoate, which can be purified by chromatography and distillation.

By using other alcohols in place of isopentyl alcohol in the process of this example, such as methyl alcohol, isopropyl alcohol, t-butyl alcohol, cyclopropyl alcohol, prop-2-en-1-ol and prop-2-yn-1-ol, the corresponding esters are prepared, i.e., methyl 3,7,11-trimethyldodec-2-en-4-ynoate;
isopropyl 3,7,11-trimethyldodec-2-en-4-ynoate;
t-butyl 3,7,11-trimethyldodec-2-en-4-ynoate;
cyclopropyl 3,7,11-trimethyldodec-2-en-4-ynoate;
prop-2'-en-1'-yl-3,7,11-trimethyldodec-2-en-4-ynoate; and
prop-2'-yn-1'-yl 3,7,11-trimethyldodec-2-en-4-ynoate.

EXAMPLE 15

Three groups of 30 each of *Aedes aegypti*, fourth instar larvae, in 50 ml. of tap water containing a few drops of liver powder suspension, room temperature of 28° and photoperiod of 18 hours, are treated with ethyl 3,7,11-trimethyldodec-2-en-4-ynoate (98.8% trans) using 50 microliters of acetone as the carrier at three different dosage levels. A fourth group is maintained under identical conditions. Each group is scored after seven days by the following system:

0=normal adult, completely emerged (free or floating); 1=abnormal adult, non-viable; 2=incompletely emerged adult; 3=dead pupa; and 4=dead larvae. For each group the total number of animals in classes 1–4 is divided by 30 to determine the percentage result. The $IC_{50}$ is computed by plotting on semi-logarithmic paper, the dose on the horizontal axis and the percentage response on the vertical axis. The $IC_{50}$ was determined to be less than 1.0 p.p.m. Each of the larvae of the control group developed into normal adults.

What is claimed is:

1. A compound selected from those of the Formula A:

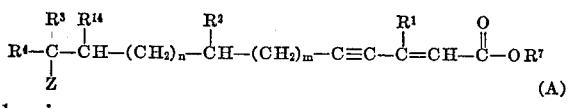

(A)

wherein, each of $R^1$, $R^2$ and $R^3$ is methyl or ethyl;
$R^4$ is lower alkyl;
$R^{14}$ is hydrogen or methyl;
each of $m$ and $n$ is the positive integer one, two or three;
Z is hydrogen or the group —OR in which R is hydrogen or lower alkyl; and
$R^7$ is hydrogen, lower alkyl, lower alkenyl, lower alkynyl or cycloalkyl.

2. A compound according to claim 1 wherein each of $R^1$, $R^2$ and $R^3$ is methyl or ethyl; $R^{14}$ is hydrogen or methyl; each of $m$ and $n$ is one or two and $R^4$ is lower alkyl.

3. A compound according to claim 2 wherein each of $R^1$, $R^2$ and $R^3$ is methyl; $R^{14}$ is hydrogen; $m$ is one; $n$ is two and $R^4$ is methyl or ethyl.

4. A compound according to claim 3 wherein Z is hydrogen, hydroxy or methoxy and $R^4$ is methyl.

5. A compound according to claim 4 wherein $R^7$ is hydrogen or lower alkyl.

6. A compound according to claim 5 wherein Z is hydrogen and $R^7$ is ethyl.

7. A compound according to claim 4 wherein $R^7$ is prop-2'-en-1'-yl, prop-2'-yn-1'-yl or cyclopropyl.

8. The C-2 (trans) and C-2 (cis) isomers of the compound of claim 6.

9. A compound according to claim 3 wherein Z is hydrogen.

10. A compound according to claim 9 wherein $R^7$ is hydrogen or lower alkyl.

References Cited

UNITED STATES PATENTS 3,579,550   5/1971   Demole _____ 260—413
3,716,565   2/1973   Henrick et al. ____ 260—410.9 R

OTHER REFERENCES

Chemical Abstracts, vol. 65, 616e (1966).

ELBERT L. ROBERTS, Primary Examiner

D. G. RIVERS, Assistant Examiner

260—340.9, 410, 410.9 N, 413, 488 H, 615 A, 408, 615 R, 633, 635 R, 638 B, 456 R; 424—312, 318, DIG. 12